Figure 1:
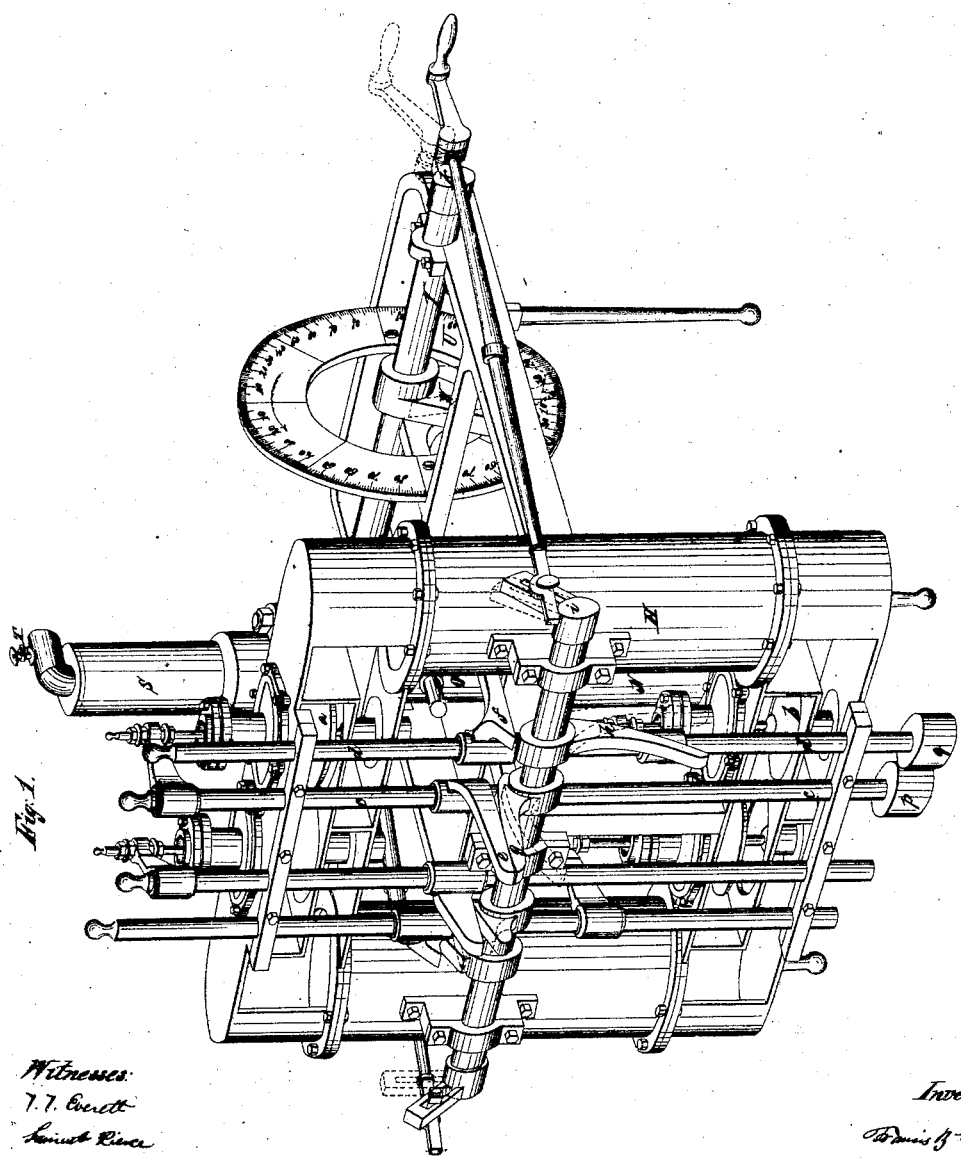

No. 35,789. F. B. STEVENS. PATENTED JULY 1, 1862.
HEATING FEED WATER FOR STEAM ENGINES.
3 SHEETS—SHEET 1.

Witnesses:
T. T. Everett
Samuel Pierce

Inventor:
Francis B. Stevens

No. 35,789. PATENTED JULY 1, 1862.
F. B. STEVENS.
HEATING FEED WATER FOR STEAM ENGINES.
3 SHEETS—SHEET 2.
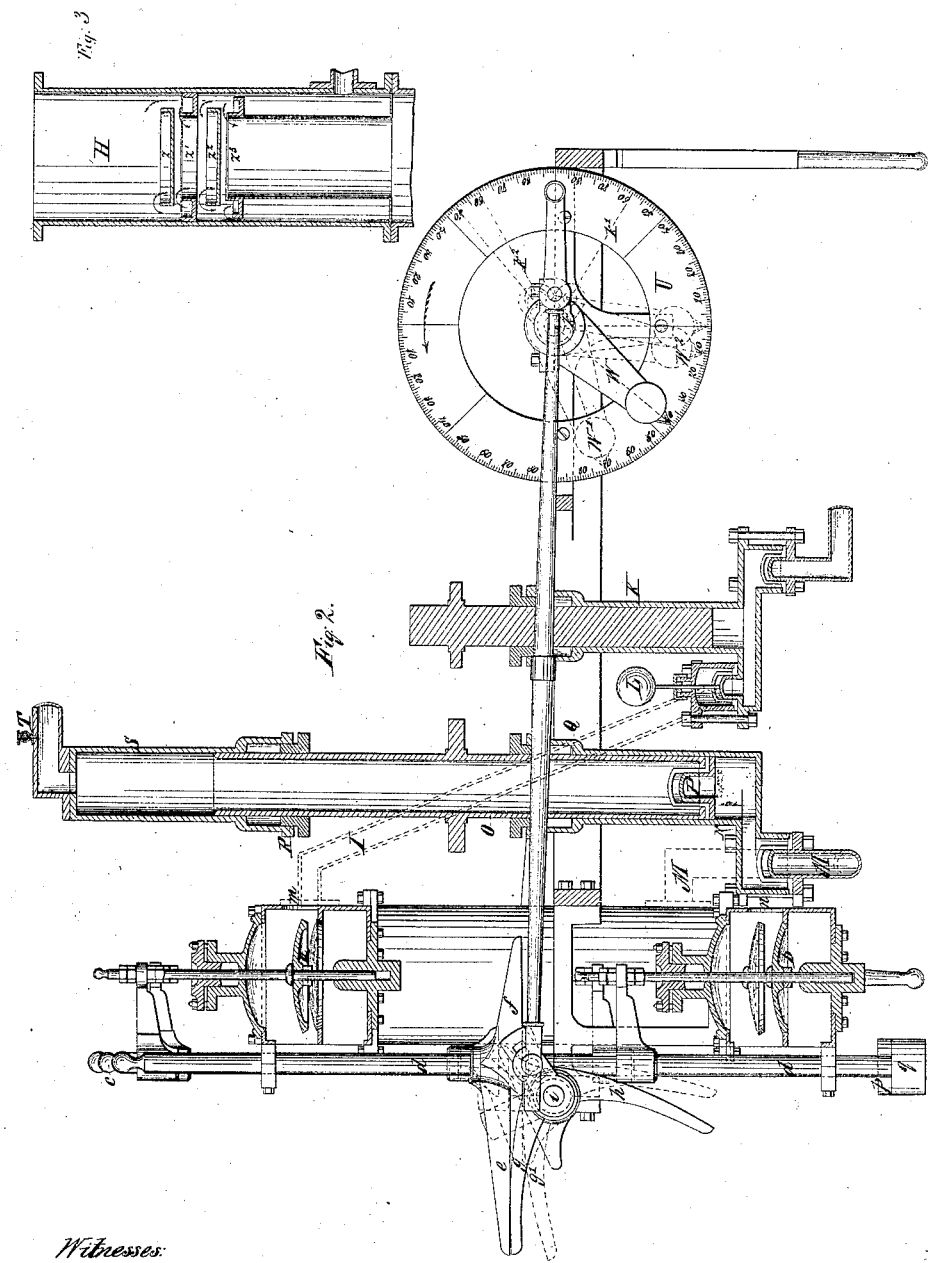
Witnesses:
J. J. Everett
Samuel Pierce
Inventor:
Francis B. Stevens No. 35,789. PATENTED JULY 1, 1862.
F. B. STEVENS.
HEATING FEED WATER FOR STEAM ENGINES.
3 SHEETS—SHEET 3.
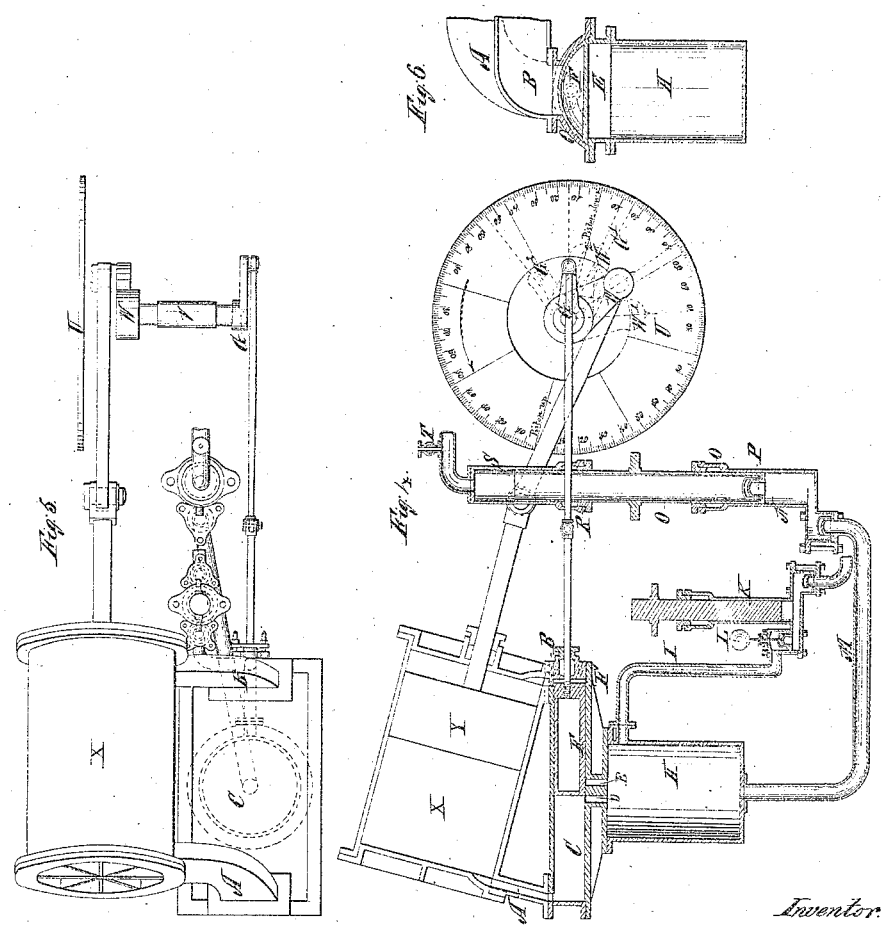
Witnesses:
T. T. Everett
Samuel Pierce
Inventor:
Francis B. Stevens

UNITED STATES PATENT OFFICE.

FRANCIS B. STEVENS, OF NEW YORK, N. Y.

IMPROVEMENT IN HEATING FEED-WATER FOR STEAM-ENGINES.

Specification forming part of Letters Patent No. 35,789, dated July 1, 1862.

*To all whom it may concern:*

Be it known that I, FRANCIS B. STEVENS, of city, county, and State of New York, have invented a new and useful Improvement in Heating the Feed-Water of Steam-Engines; and I do hereby declare that the following is a full and exact description thereof, reference being had to the accompanying drawings, and to the letters of reference marked thereon.

It has frequently been proposed to heat the feed-water of steam-engines by steam withdrawn from the induction side of the piston by additional eduction-valves opening after the closing of the communication from the boiler and closing before the opening of the main eduction-valves, and many devices for effecting this object have been patented; but I am not aware that any of them have been beneficially operative, or that any of them have been even practically operative.

The object of my invention is to improve this method of heating the feed-water, so that it may become practically operative, and also so that an economic gain in fuel may result from its use.

I improve the action of the valves by applying machinery to open and close them in the period commencing after the steam has been cut off, and ending at a sufficient time before the piston gets to the end of its stroke to allow for a proper degree of lead to be given to the main eduction-valves, and I hold the valves on their seats when the pressure in the heater is greater than the pressure in the cylinder by balancing the valves and by weighting them. I improve the arrangement and structure of the pumps by using an injection-pump to deliver the cold water into the closed heater, in combination with the withdrawing-pump to remove it, as the action then will be much more certain and reliable than when the water is drawn into the heater by the vacuum existing there, and I prevent this injection-pump from delivering more than its capacity at each stroke by weighting its delivery-valve, or by a weighted check-valve placed between the pump and the heater. As the water expands in the heater, it is necessary that the size of the withdrawing-pump be made larger than that of the injection-pump. Thus, if the water is heated from 40° Fahrenheit to 200° Fahrenheit it will have to be made four per cent. greater in capacity. I contemplate in all cases using a closed heater, for there is a great and decided advantage in using a closed heater instead of an open one, even when the water is to be heated below 212°.

I have found by experiment that the presence of atmospheric air, even in very small quantities, interferes very greatly with the action of steam-heating water. If the construction of the machinery be such that a large quantity of air enters the heater, the difference in the capacities of the pumps must always be great enough to insure its removal.

The ordinary force-pump can be used for the withdrawing-pump; but I prefer a lifting-pump, and as the packing of the piston or bucket of the ordinary lifting or air pump is inaccessible when the pump is in motion I use a pump with a hollow plunger, the valve or bucket being placed in this plunger and the water delivered through it, the end of the plunger outside of the pump having an additional packing where it enters the pipe leading to the boiler. By this means I get a lifting-pump that will withdraw the air from the heater, and I also have the packing as accessible as it is in the ordinary feed-pump.

Even although this proposed method of heating the feed-water be made practical and reliable in its operation, it by no means follows that an economic gain in fuel will be the result. The gain in fuel, when any, will be the difference between the gain in heating the feed-water and the losses caused, first, by the diminished pressure on the piston; secondly, by the waste of steam in the spaces of the additional valve-openings and the average leakage of additional valves; thirdly, by power necessary to work the additional valves and pumps, so that it may very well be that the losses from these three causes may be greater than the gain in heating the feed-water.

The loss by the last-named cause need not be considered, as it is not great, and would generally be uniform. The greatest loss would be that caused by the diminished pressure on the piston, and to make this as small as possible it is necessary that the additional eduction-valves should open and close when the piston is as near the bottom of its stroke as other circumstances will allow, and that the time of opening and closing the additional eduction-valves should be as short as possible. It is also necessary that the valves be large enough for the passage of the requisite quantity of steam to the heater, and yet that they be not made too large, so that the loss caused by the waste of steam in the spaces of the valve-openings and by the average leakage of the valves may not be unduly increased.

As I was unable to find any data published either in this country or in Europe that would enable me to ascertain what quantity of water would be heated by steam passing through a valve opened and closed in a given period of time, I was obliged to make experiments to obtain this data, and from them I obtained the following results: The first result was that one double-beat Cornish valve, ten inches in diameter, being raised one-quarter of its diamter from its seat while the shaft of the engine moved through an arc of thirty degrees and then lowered in the time the shaft revolved the same number of degrees, the shaft of the engine revolving thirty times in a minute, and the steam flowing from the cylinder into the heater under a pressure of thirty pounds above that in the heater, allowed sufficient steam to flow from the cylinder into the heater to heat five hundred pounds of water 100° Fahrenheit in one minute of time.

The second result was, the conditions above mentioned being the same excepting the diameter of the valve, that the quantity of water heated 100° in one minute increased as the area of the valve increased.

The third result was, all the conditions first mentioned being the same excepting the number of times the shaft revolved in a minute, that the quantity heated 100° in a minute did not vary, the same quantity being heated 100° degrees in a minute when the shaft made one turn in a minute that was heated when it made thirty turns in a minute.

The fourth result was, all the conditions first mentioned being the same excepting the pressure of steam, that the quantity of water heated 100° in a minute was in proportion to the pressure of steam (counting the pressure above a vacuum) flowing from the cylinder into the heater.

The fifth result was, all the conditions first mentioned being the same excepting the number of degrees of the arc, that the quantity of water heated 100° in a minute was in proportion to the number of degrees of the arc. Thus if the valve was made to open and close while the shaft revolved through an arc of twenty-five degrees, instead of through an arc of sixty degrees, then the quantity heated 100° in a minute was two hundred and nine pounds instead of five hundred pounds. The data here given will enable any one familiar with the usual methods of proportioning the openings of steam-engines to give the proper proportions to the additional eduction-valves under all the different circumstances of varying size of engine, velocity of piston, and pressure of steam.

I will now proceed to describe my invention with the aid of a reference to drawings.

Figure I is a perspective drawing of an application of my improvement. Fig. II is a longitudinal sectional view of the same. Fig. III is a sectional view of the heater.

The valves shown are puppet-valves.

The machinery that opens and closes the eduction-valves is here represented by that in most common use in this country for low-pressure engines.

The machinery that opens and closes the additional eduction-valves is here represented by that known as "Stevens' cut-off."

The induction-valves are not shown.

$a$ is the upper additional eduction-valve.
$b$ is the lower additional eduction-valve.
$c$ and $d$ are the lifting-rods, to which the additional valves are attached, $a$ being attached to $c$ and $b$ to $d$.

$e$ and $f$ are feet attached to the rods $c$ and $d$, $e$ being attached to $c$ and $f$ to $d$.

$g$ and $h$ are toes or tappets, that act against the feet $e$ and $f$ and raise and lower the valves $a$ and $b$, $g$ raising $a$ and $h$ raising $b$.

$i$ is the rock-shaft, to which the tappets $g$ and $h$ are attached.

$k$ is a small crank attached to the main shaft of the engine and communicating a vibratory motion to the rock shaft.

$m$ is the upper opening leading from the valves to the cylinder.

$n$ is the lower opening leading from the valves to the cylinder.

$p$ is a weight attached to the lifting-rod $c$ to keep the valve $a$ on its seat.

$q$ is a similar weight attached to the rod $d$ to keep the valve $b$ in its seat.

H is the heater communicating with the upper end of the cylinder by the additional eduction-valve, $a$, and with the lower end by the additional eduction valve, $b$.

I is a pipe leading from the injection-pump to the heater.

K is the injection-pump for injecting water into the heater.

L is a weight loading the delivery-valve to prevent the water from being drawn through the pump K into the heater in undue quantity whenever a partial vacuum may be formed there.

M is the pipe leading from the heater to the withdrawing-pump.

N is the withdrawing-pump.

O is the hollow plunger of the withdrawing-pump.

P is the valve in the hollow plunger.

Q is the stuffing-box of the pump N.

R is the stuffing-box of the pipe S, leading from the withdrawing-pump to the boiler.

T is the cock for discharging air and water from the heater.

U is a dial for noting the number of degrees that the crank or shaft of the engine revolves.

V is the main shaft of the engine.

W is the main crank of the engine.

Z, Z', Z², and Z³ show circular dishes, that can be placed in the heater for the purpose of exposing a greater amount of surface of water to the steam.

The operation is as follows: When the crank W, revolving in the direction indicated by the arrow, arrives at the position, W', (drawn in dotted lines,) it is seventy degrees from the lower center, and the piston, moving at the same time from the top toward the bottom of the cylinder, has completed about sixty-seven one-hundredths of its stroke, the passage of the steam from the boiler to the cylinder being supposed to have been previously intercepted, then the crank $k$ will be at the position $k'$, (shown in dotted lines,) and the tappet $g$ will be at the position $g'$, (shown in dotted lines,) and will be upon the point of commencing to open the upper additional eduction-valve, $a$, and to allow the steam from the upper side of the piston to enter the heater H. When the crank arrives at the position in which it is drawn in full lines, both in the perspective drawing and in Fig. II, it is then forty degrees from the lower center, and the piston has completed eighty-two one-hundredths of its stroke, the small crank $k$ and the tappet $g$ are shown at the extremity of their throw, and the upper additional eduction-valve, $a$, is shown wide open. When the crank W arrives at the position W², (shown in dotted lines,) it is ten degrees from the lower center, and the piston has completed ninety-nine one-hundredths of its stroke and the small crank $k$ will be at the position $k^2$, (shown in dotted lines,) and the tappet $g$ will be at the position $g'$, (shown in dotted lines,) and will have just closed the upper additional eduction valve, $a$. The upper eduction-valve commences to open after the upper additional eduction-valve has closed, and thus the steam in the heater can never pass into the condenser. As the upper eduction-valve commences to open when the crank is ten degrees from the lower center, it will be seen that a certain degree of lead is given to this valve.

The operation on the return-stroke of the piston is the same as here described, the tappet $h$ opening and closing the valve $b$. As the valves $a$ and $b$ here shown are single and unbalanced, they must be retained on their seats by the weights $p$ and $q$, attached to the lifting-rods.

Any form of valve known can be used for additional eduction-valves, provided that provision be made to retain the valves on their seats against the pressure in the heater.

Fig. IV is the longitudinal sectional drawing of an application of my improvement where a slide is used to open and close the additional eduction-passages. Fig. V is a horizontal view of the same.

Fig. VI is a sectional drawing of the slide-valve chest and heater. A and B are valve-openings made at each end of the cylinder and opening from it into the valve-chest C. D and E are the valve-openings in the seat of the valve-chest, opening from the valve-chest into the heater. F is a slide moving backward and forward in the valve-chest. This valve is made to fit accurately in the valve-chest, and the circular top is packed against the chest, so that there is no pressure on the top of the slide nor any communication between the two ends of the chest. G is a crank that moves the valve F. The other letters of reference from H to W, both inclusive, are the same as used for Figs. I, II, III. X is the cylinder of the engine. Y is the piston of the engine.

The operation is the same as shown by the puppet-valves. The slide F commences to open the passage D when the crank is at the position W', or seventy degrees from the lower center, opens the passage fully when the crank is forty (40) degrees from the center, and closes it when the crank is at W² or ten (10) degrees from the center.

The operation on the return-stroke of the piston is the same, the other end of the slide F (marked F',) opening and closing the passage E.

In regard to the extent to which the water may be heated, I may state that with steam passing from the cylinder to the heater at a pressure of thirty pounds above the atmosphere I have found no difficulty in heating the feed-water up to 250° Fahrenheit, and up to 300° when the pressure was one hundred pounds above the atmosphere.

What I claim as my invention is—

1. The additional eduction-valves, as shown and described, closing when the piston is at a sufficient distance from the end of its stroke to allow the main eduction-valve to open with lead.

2. The combination of the additional eduction valves, the closed heater, and the injection and withdrawing pumps, substantially as shown and described.

3. The arrangement and combination of the two pumps differing in capacities, as described.

4. The weighted check-valve, or its equivalent, placed between the injection-pump and heater.

5. The plunger-pump having a valve placed in the hollow plunger, and having the plunger packed by two stuffing-boxes, one at the top of the pump and the other at the entrance of the pipe or chamber.

I make all these claims only in connection and combination with heating the feed-water by steam withdrawn from the induction side of the piston.

FRANCIS B. STEVENS.

Witnesses:
T. T. EVERETT,
D. ROWLAND.